US012736809B2

(12) United States Patent
Xia et al.

(10) Patent No.: US 12,736,809 B2
(45) Date of Patent: Sep. 15, 2026

(54) WAVEGUIDE WITH DIFFRACTIVE OPTICAL ELEMENT

(71) Applicant: Dualitas Ltd, Milton Keynes (GB)

(72) Inventors: Yiren Xia, Milton Keynes (GB); Timothy Smeeton, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 202 days.

(21) Appl. No.: 18/397,689

(22) Filed: Dec. 27, 2023

(65) Prior Publication Data

US 2024/0231088 A1 Jul. 11, 2024

(30) Foreign Application Priority Data

Jan. 6, 2023 (GB) ...................................... 2300211

(51) Int. Cl.
*G02B 27/01* (2006.01)
*G03H 1/22* (2006.01)

(52) U.S. Cl.
CPC ....... *G02B 27/0103* (2013.01); *G03H 1/2294* (2013.01); *G02B 2027/0123* (2013.01)

(58) Field of Classification Search
CPC .... G02B 27/01; G02B 27/30; G02B 27/0103; G02B 27/4277; G02B 27/0075;
(Continued)

(56) References Cited

U.S. PATENT DOCUMENTS

2018/0341219 A1 11/2018 Shestak et al.
2018/0341223 A1 11/2018 Shestak et al.
2022/0066204 A1* 3/2022 Pfeiffer .................. G02B 6/125

FOREIGN PATENT DOCUMENTS

DE 102018213061 A1 1/2020
GB 2607672 A 12/2022
(Continued)

OTHER PUBLICATIONS

UKIPO, Combined Search and Examination Report under Sections 17 and 18(3), Application No. GB2300211.6, mailed Jul. 6, 2023, 6 pages.
(Continued)

*Primary Examiner* — Jie Lei

(74) *Attorney, Agent, or Firm* — McDonnell Boehnen Hulbert & Berghoff LLP

(57) ABSTRACT

A holographic projector includes a waveguide that includes a pair of opposing reflective surfaces arranged to receive and waveguide a hologram/holographic wavefront therebetween. A first surface of the pair of complementary surfaces is partially reflective-partially transmissive such that a plurality of replicas of the hologram/holographic wavefront are emitted therefrom. The holographic projector further includes a diffractive optical element arranged to receive the plurality of replicas of the hologram/holographic wavefront from the first surface of the waveguide and principally redirect each replica into a respective non-zero diffractive order defined by a diffraction angle. The holographic projector also includes an array of louvres arranged to receive the hologram/holographic wavefront from the diffractive optical element, where the array of louvres is substantially transmissive at the non-zero diffraction angle and substantially non-transmissive at a zeroth diffraction angle of the diffractive optical element.

21 Claims, 9 Drawing Sheets

(58) Field of Classification Search
CPC ........ G02B 27/0081; G02B 2027/0123; G02B 2027/0125; G02B 6/10; G02B 6/0035; G02B 6/0033; G02B 6/0041; G02B 6/0043; G02B 5/18; G02B 5/1814; G02B 5/1842; G03H 1/22; G03H 1/2294; G03H 1/2205; G03H 1/0402; G03H 1/2286; G03H 2001/2242; G03H 2001/2207; G03H 2001/2284; G03H 2223/12; G03H 2223/23; G03H 2223/16
USPC ....... 359/13, 15, 32–34, 443, 460, 462, 566, 359/629
See application file for complete search history.

(56) References Cited

FOREIGN PATENT DOCUMENTS

| | | | |
|---|---|---|---|
| WO | 2020243111 | A1 | 12/2020 |
| WO | 2021242898 | A1 | 12/2021 |

OTHER PUBLICATIONS

Draper, Craig T., and Pierre-Alexandre Blanche. "Examining aberrations due to depth of field in holographic pupil replication waveguide systems." Applied Optics 60, No. 6 (2021): 1653-1659.

* cited by examiner

WAVEGUIDE WITH DIFFRACTIVE OPTICAL ELEMENT

CROSS-REFERENCE TO RELATED APPLICATIONS

This application claims the benefit of priority of United Kingdom Patent Application No. 2300211.6 filed Jan. 6, 2023, which is hereby incorporated herein by reference in its entirety.

FIELD

The present disclosure relates to a holographic projector. More specifically, the present disclosure relates a holographic projector comprising a waveguide and a diffractive optical element. Some embodiments relate to a picture generating unit or head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device.

The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

In a first aspect, there is provided a holographic projector comprising a waveguide and a diffractive optical element. The waveguide comprises a pair of surfaces. The pair of surfaces may be complementary to one another, may oppose one another and/or one or both of the surfaces in the pair of surfaces may be at least partially reflective. The pair of surfaces are arranged to waveguide a wavefront therebetween. A first surface of the pair of surfaces is reflective-transmissive or "transflective". In other words, the first surface is partially reflective-partially transmissive. In this way, a plurality of replicas of the wavefront are emitted from the first surface. A second surface of the pair of surface is reflective e.g. substantially fully reflective such as greater than 95% reflective. Thus, the waveguide may act as a pupil expander or replicator. In some embodiments, the waveguide is arranged to receive a hologram or holographic wavefront (i.e. wavefront encoded/modulated in accordance with the hologram). In such embodiments, the plurality of replicas of the wavefront emitted from the first surface may be replicas of the hologram or holographic wavefront.

The diffractive optical element is arranged to receive the plurality of replicas from the first surface of waveguide, which may be a plurality of replicas of a hologram/holographic wavefront as described above. The diffractive optical element is arranged to diffract the wavefront of each replica. For example, the diffractive optical element may comprise features having a feature size less than the wavelength of the wavefront. Each diffracted wavefront may comprise a zeroth order of diffraction (also referred to as a zero order) and one or more non-zero or "higher" orders of diffraction. The diffractive optical element may be arranged so that the wavefront is principally diffracted into a respective non-zero diffraction order. In other words, the diffractive optical element may be described as being arranged to principally redirect each replica into a respective non-zero diffractive order defined by a diffraction angle. For example, each replica may be principally redirected into a respective first diffractive order such as the +1 or −1 diffractive order.

As used herein, the non-zero diffraction order that the diffractive optical element is arranged to principally diffract or redirect or deflect each wavefront into may be a non-diffraction order that is utilized for display. For example, light of the principal non-zero diffraction order may be angled so as to be received at an eye-box or viewing window, whereas light of the other non-zero diffraction orders may not reach the eye-box. In some embodiments, the diffractive optical element may be arranged to redirect more than 30%, optionally more than 50%, optionally more than 90%, optionally more than 95% of the optical energy of the respective or corresponding hologram/replica emitted by the waveguide. In some embodiments, the diffractive optical element may direct more optical energy into the respect common (principal) non-zero diffraction order than any other diffraction order. This may include the zeroth order. The zeroth order may correspond to light that it is transmitted by the diffractive optical element. As such, the turn/redirection of the zeroth order light cannot be controlled by the diffractive optical element. In other words, the angle of the zeroth order light with respect to a normal of the diffractive optical element may be equal to the angle of incidence of the or each wavefront received by the diffractive optical element with respect to the normal of the diffractive optical element. The above descriptions of proportions/amounts of light energy being redirected into different diffraction order may refer to the amount of light energy diffracted at a specific range of wavelengths. In some embodiments, the holographic projector is arranged to project light having a plurality of different wavelengths at different parts of the electromagnetic spectrum, for example red, green and/or blue light. In such embodiments, the diffractive optical element may principally diffract light of each of respective part of the electromagnetic spectrum according to one or more of the above described proportions. In such embodiments, the diffractive optical element may be arranged such that the brightness/intensity of the principal non-zero diffraction achieves a desired colour balance. In some embodiments, the diffractive optical element is arranged such that the diffraction angle of the respective non-zero diffractive order may be common for each respective replica. In other words, a wavefront or light path or optical axis associated with the respective non-zero diffractive order of each replica may be parallel.

The inventors have found that the diffractive optical element described above advantageously allows for the wavefront replicas emitted by the waveguide to be effectively redirected or turned with fine control of the angle of the "diffracted" or "redirected" (non-zero order) component of the wavefronts. Furthermore, the inventors have found that such a diffractive optical element can advantageously redirect or turn the light in two planes. Furthermore, the inventors have found that such a diffractive optical element can advantageously be manufactured in a way which does not result in dark bands in the holographic projection, or scattering. The inventors have also surprisingly found that the use of a diffractive optical element allows for wavefront replicas emitted by the waveguide to be redirected or turned without substantial degradation of the hologram or reconstruction.

Many applications of the holographic projector may require the holographic wavefront/s to be emitted at a certain angle so as to be received at a particular target or position such as eye-box position. However, the angle of the wavefront replicas emitted by a waveguide may depend on an input angle of the wavefront into the waveguide. The input angle may have a limited range because pupil replication may only occur within a suitable range of input angles. The suitable range of input angles may depend on, for example, the refractive index of the material(s) forming the waveguide, the dimensions of the waveguide (e.g. a distance separating the pair of surfaces) and the wavelength of the light. Outside of the suitable range of input angles, waveguiding of the wavefront between the pair of surfaces of the waveguide, and associated replication of the wavefront at the first surface, may not be achieved. So, in the absence of the diffractive optical element, the possible range of angles of the emitted wavefronts are limited. So, in some case, the entire holographic projector may need to be tilted in order to achieve the emitted wavefronts being received at the required angle or position. This can be problematic. For example, in a head-up display in a vehicle, the wavefronts emitted by the first surface of the waveguide may be projected to an optical combiner to form an image viewable from an eye-box. The waveguide may be positioned in the dashboard of the vehicle. The waveguide may lie in a plane. Preferably, the plane the waveguide lies in is horizontal within the dashboard. This may advantageously minimise the volume occupied by the waveguide/holographic projector within the dashboard. However, when the waveguide lies in said plane, the possible range of angles of the wavefronts emitted by the waveguide may not reach the optical combiner and/or eye box. To correct this, either the entire waveguide/holographic projector must be titled (undesirably increasing the volume occupied within the dashboard) or further optical components may be required to turn the emitted wavefronts.

One option the inventors have considered is the provision of a turning layer comprising an array of transparent prisms on the first surface of the waveguide. The inventors have found that such a turning layer can advantageously turn the wavefronts emitted by a waveguide in a compact way without required complex optics. However, this solution has limitations. For example, discontinuities in the prism surface may introduce dark bands in the projected image/hologram. Furthermore, the range of turning angles is limited by the geometry of the prism and it is generally only possible to turn the wavefronts in one dimension with one array of prisms. Furthermore, it is difficult to manufacture the prism array. Any imperfections in the prism array (such as in corners of the prism) may cause unwanted scattering of the emitted wavefronts.

The inventors have found that a diffractive optical element allows fine control of the turn/redirection of the wavefronts emitted by the waveguide in two orthogonal directions without the creation of dark bands and without scattering the emitted wavefronts.

As is well known, a diffracted wavefront will form a plurality of diffraction orders. The diffraction orders include a zeroth order (which comprises light which is transmitted rather than diffracted) and a plurality of positive and negative non-zero orders. There may be n non-zero diffractive order. n may be a non-zero integer. n may be positive or negative. Each of the diffraction orders may each contain the hologram/image content encoded within each wavefront. Each diffraction order is typically emitted in a different direction and so light associated with each diffraction order is spatially separated. The inventors have found that a diffractive optical element (as above) can advantageously be arranged to control the angle and/or intensity distribution of the non-zero diffraction orders with a high degree of precision. In this way, the diffractive optical element can be arranged so that the intensity of each wavefront emitted by the waveguide may advantageously be principally redirected into one common non-zero diffraction order of the plurality of diffraction orders, referred to herein as the principal diffraction order. The diffractive optical element is further arranged so that said common non-zero diffraction order is emitted at a desired angle (for example, so as to form an image in an eye-box by directing a holographic wavefront, and plurality of replicas thereof, at the correct angle) without the need to apply a global tilt to the holographic projector. The diffractive optical element may be arranged such that the intensity of the other (i.e. non-principal) non-zero diffraction orders may be much lower than (e.g. less than half) the principal diffraction order. By maximising the intensity of the principal diffraction order, the amount of light that is wasted may be minimised. The diffractive optical element may be arranged such that the principal non-zero diffractive order is angled so as to form a virtual image visible/perceivable from an eye-box. The diffractive optical element may be arranged such that the other non-zero diffractive orders do not reach the eye-box via the optical combiner or otherwise. This advantageously means that ghost images associated with the non-principal diffraction orders may not be received at the eye-box.

The diffractive optical element may comprise one or more patterns. The one or more patterns may be diffractive patterns. Each pattern may comprise one or more diffraction gratings. The diffractive optical element may be a holographic optical element. The holographic optical element may comprise one or more holograms (such as a computer-generated hologram) recorded in the optical element. The or each hologram may be calculated/arranged to diffract the wavefront as described above so that the intensity of the principal diffraction order is maximised and directed/redirected at a desired angle. The holographic optical element may be a volume diffraction element/volume holographic optical element. The holographic optical element may comprise a volume hologram. The holographic optical element may comprise a volume Bragg grating.

In some embodiments, the diffractive optical element may comprise a plurality of layers. The plurality of layers may form a stack. At least some, optionally each, of the layers may comprise a pattern such as a diffractive pattern or hologram. The diffractive pattern of at least some, optionally each, of the layers may comprise a different diffractive pattern or hologram. The combination of each of the layers in the stack combined may form a volume diffraction pattern/volume hologram/volume Bragg grating, as described above. Each of the layers may comprise a photopolymer film. Each of the layers comprising a photopolymer film may comprise a varying refractive index which may have a periodic modulation function.

In some embodiments, the diffractive optical element comprises a photosensitive material such as silver halide or photopolymer such as dichromated gelatin. In some embodiments, the diffractive optical element may be in the form of a film such as a thin-film, optionally having a thickness of between 0.1 nanometre and 10 micrometres, optionally having a thickness of between 10 nanometres and 1 micrometre. The film may be or comprise a photopolymer film. A refractive index of the photopolymer film may vary across the height and/or width of photopolymer film. The varying refractive index may form one or more patterns, such as diffractive patterns/gratings. The refractive index of the film may have a periodic modulation function. The periodic modulation function may have a respective periodicity and axis/angle. The varying refractive index may diffract the wavefronts emitted by the waveguide and received by the diffractive optical element.

In some embodiments, the holographic projector comprises a turning layer comprising the diffractive optical element. The turning layer may be arranged on the first surface of the waveguide (in other words, the turning layer may be arranged on an output of the waveguide). The turning layer may be fixed to the waveguide.

In some embodiments, the holographic projector further comprises an array of louvres. The array of louvres may be arranged to receive the wavefront/hologram/holographic wavefront/replica light from the diffractive optical element. For example, the array of louvres may be arranged to receive a zeroth diffractive order and at least one or some, preferably all, of the non-zero diffractive orders associated with each wavefront/hologram/holographic wavefront/replica emitted from the first surface of the waveguide, including the principal non-zero diffraction order. The array of louvres may be arranged to be substantially transmissive at the non-zero diffraction angle of the diffractive optical element. This may mean that the common (principal) non-zero diffraction order is transmittable through the array of louvres. In other words, the array of louvres is transmissive to the non-zero diffraction order such as transmissive at the angle of the non-zero diffraction order. The individual louvres of the array of louvres may be formed of or comprise a substantially opaque material. The individual louvres of the array of louvres may be configured to substantially absorb light but gaps or spaces between the louvres can transmit light, of course. The individual louvres may be negligibly thin such that proportion of light angled parallel to the louvres that is absorbed by the thickness/an end face of the louvres is substantially negligible. For example, the distance between adjacent louvres may be at least five times, optionally at least 10 or 20 times greater than the thickness of an individual louvre. The array of louvres being arranged to be substantially transmissive at the non-zero diffraction angle of the diffractive optical element may mean that the individual louvres of the array of louvres are arranged (for example, sized and/or angled) to substantially allow light at the respective non-zero diffraction angle to be transmitted by the array of louvres.

The array of louvres may be substantially non-transmissive at a zeroth diffraction angle of the diffractive optical element. For example, the array of louvres may be arranged to directly receive and substantially absorb light of the zeroth diffraction order emitted at the zeroth order of the diffractive optical element. In other words, the zeroth order of each replica may be incident upon a louvre. Thus, the light of the zeroth diffraction order may be prevented from being transmitted beyond the array of louvres and, in particular, may be substantially prevented from being received by a viewing system. The zeroth diffraction order may have a different diffraction angle to the non-zero diffraction light (in particular, the common—principal—non-zero diffraction order). So, the zeroth order light may not be projected towards an optical combiner and then towards the eye box. However, there is a risk that, without the array of louvres, zeroth order light may indirectly reach the eye-box after being reflected off some other component or because of the shape of optical combiner (which may have a complex curved shape). This would be undesirable. By not transmitting/substantially absorbing the zeroth order light, the louvre array may be arranged to substantially prevent the zeroth order light from being received by the viewing system.

The array of louvres being arranged to block the zeroth order is particularly advantageous because the diffractive optical element cannot be used to control the angle of the zeroth order (the zeroth order corresponds to a proportion of light that is transmitted by the diffractive optical element rather than diffracted). However, the array of louvres may additionally or alternatively be substantially non-transmissive to one or more other diffractive angles of other diffraction orders. The one or more other diffractive angles may comprise one or more non-zero diffraction orders that are different to the common (principal) non-zero diffraction orders. For example, if the common (principal) non-zero diffraction order is the first non-zero diffraction order, the one or more other diffractive angles may comprise one or more non-zero diffraction orders being greater than the first diffractive order. The array of louvres may be substantially non-transmissive to all diffractive order at respective diffractive angles other than the respective common (principal) non-zero diffraction order.

The holographic projector may further comprise a reflection suppression layer. The reflection suppression layer may comprise the array of louvres. The reflection suppression layer may act as a glare countermeasure. In particular, the louvres may be arranged to absorb glare, for example from sunlight or prevent propagation of glare to an eye-box. As above, the pair of surfaces of the waveguide are reflective. So, without the reflection suppression layer, there is a risk that light from another light source, such as sunlight, incident on one of the pair surface may be reflected towards a viewing system in the eye box. Glare could reach the eye box directly or indirectly. The louvres may be arranged to absorb glare incident directly on the louvres. The louvres may also be angled to absorb most light that is incident on the waveguide.

In some embodiments, each louvre of the array of louvres has a sidewall with a width (height) defined between a proximal end/edge adjacent the first surface of the waveguide and a distal end/edge. Each of the louvres may be angled to relative a plane of the first surface of the waveguide. Optionally, a pitch between adjacent louvres of the louvre structure may be such that the distal end/edge of one louvre overlaps the proximal end/edge of the adjacent louvre. That is, a footprint of a first louvre on the first surface overlaps with a footprint of a second louvre on the first surface, wherein the first louvre is immediately adjacent the second louvre in the array of louvres. Alternatively, it may be said that a projection of the first louvre onto the first surface overlaps with a projection of the second louvre onto the first surface. The amount of overlap (e.g. distance) or the degree of overlap (percentage overlap) between adjacent louvres may be constant for the array of louvres. Alternatively, the amount or degree of overlap may be variable, for instance according to position within the array of louvres. Owing to the angled orientation and overlap of (sidewalls of) adjacent louvres, rays of sunlight/glare that follow an optical path to the first surface that passes between the louvres, may advantageously be reflected back onto an optical path that is blocked by at least one louvre. Thus, sunlight reflected by the first surface is absorbed or attenuated (e.g. diffusely scattered) by the louvre slat instead of being specularly reflected towards a viewing area/eye-box. At the same time, the wavefront replicas emitted by the first surface may pass through the array of louvres. In some embodiments, each louvres of the array of louvres is angled parallel to the angle of the common (principal) non-zero diffractive order. As above, the wavefront may be a holographic wavefront. The holographic wavefront may comprise diverging light ray bundles forming a virtual image (upstream of the display device) and/or converging light ray bundles forming a real image (downstream of the display device). The inventors have found that the reflection suppression component disclosed herein is particularly effective when the image light is a holographic wavefront or holographic light field. Most notably, the component is effective when the hologram is a so-called channelling hologram as described below. It has been found by simulation and verified experimentally that the louvre structure of this disclosure can be configured to reduce glare whilst not adversely affecting the holographic process associated with a channelling hologram, and thus the image quality at the viewing area/eye-box.

So, the inventors have found that the array of louvres has the advantages of suppressing glare while also suppressing zeroth order from a diffractive optical element used to steer the holographic light to the eye-box using at least one higher/non-zero diffraction order.

The louvres of the array of louvres may comprise a material having one or more of: high absorption; high attenuation; low specular reflectivity, and high diffusivity of light. The person skilled in the art of optics appreciates what constitutes "high" and "low" in relation to the optical properties of a material. In some embodiments, the term "high" means greater than 80% such as greater than 90% or 95% and the term "low" means less than 20% such as less than 10% or 5%. For example, the term "high attenuation" may mean that the intensity of incident light (e.g. sunlight) is attenuated (i.e. reduced) by at least 95%.

The louvres may extend longitudinally in a first dimension, and may be spaced apart in a second dimension, orthogonal to the first dimension. The first and second dimensions may correspond to the dimensions of the first surface of the waveguide.

The separation between adjacent louvre slats in the second dimension may be defined as the pitch. In some arrangements, the spacing or periodicity of the louvres is uniform for the array. In other arrangements, the pitch may vary between slats of the array, such as from a first end to a second end of the array. It may be said that the spacing or periodicity of the slats of the array is non-uniform for the array. This may enable the overlap between louvres to be varied according to position within the array. In some arrangements, the angle of the (sidewalls of the) louvres slats may be uniform (i.e. constant) across the array in the second dimension. In other arrangements, the angle of the (sidewalls of the) louvres may vary across the array, such as from a first end to a second end of the array in the second dimension. This may enable the overlap between louvres to be varied according to position within the array, in addition or alternatively to variation of the louvre pitch.

In some embodiments, the array of louvres comprises louvres slats that are spatially separated by air. In other embodiments, the array of louvres includes a transparent structure between adjacent louvres slats of the array. In these embodiments, the transparent structure is configured (shaped) to allow image light from the display system to pass through the structure between the louvres. The transparent structure may improve the structural and functional integrity of the louvre structure, so that it is more robust (less easily damaged) and may be more easily cleaned. The transparent structure may comprise parallel light transmission surfaces. The transparent structure may define a serrated surface, for example a sawtooth surface.

A first plane may be defined that is perpendicular/orthogonal to the first surface of the waveguide. A second plane may be defined that is perpendicular/orthogonal to the first surface of the waveguide and perpendicular/orthogonal to the first plane. The waveguide may have the form of a slab. The slab may have a length extending in a first direction and a width extending in a second direction. The length may be longer than the width. The first plane may be parallel to the first direction. The second plane may be parallel to the second direction. The first plane and the second plane may intersect the waveguide. In other words, the first plane may define a cross-section along the length of the waveguide and the second plane may define a cross-section along the width of the waveguide. Each of the louvres of the louvre array may be parallel to adjacent louvres and may be elongated/extend in the second direction. As described above, a wavefront received by the pair of surfaces of the waveguide may be waveguided between the pair of the surfaces. The holographic projector may be arranged so that the wavefront is waveguided in a direction lying in the first plane. The wavefront may be may be waveguided in the first direction.

In the first plane, an angle between the zeroth diffraction order and the common (principal) non-zero diffractive order is in the range 40 to 80 degrees, optionally 50 to 70. In the second plane, an angle between the zeroth diffraction order and the common (principal) non-zero diffractive order is in the range 10 to 20 degrees. So, the diffractive optical element may be arranged to redirect the common (principal) non-zero diffractive order at angles in two planes such that the redirected common (principal) non-zero diffractive order is redirected way from the direction of waveguiding. The angles of the diffractive orders described herein may refer to angles of light of the wavefront at a first wavelength, optionally also at a second and third wavelength. The first, second and third wavelengths may correspond to red, green and blue light, respectively.

The waveguide may comprise an input port. The input port may be arranged to receive the wavefront. The input port may be formed on/by the first surface or on/by the second surface of the pair of parallel surfaces of the waveguide. The waveguide may further comprise an output port. At least a portion of the first surface may form the output port. The waveguide may be configured to waveguide the wavefront received at the input port to the output port.

The inventors have found that when a diffractive optical element is used to turn/redirect the wavefront replicas, as described, relatively large angles of turn/redirection can be achieved. In particular, larger angles of turn/redirection can be achieved than when using a prism array, as described previously. Thus, the input port of the waveguide may be positioned at or towards an end of the waveguide that is closest to a target for receiving the wavefront replicas emitted by the waveguide. Generally, replicas of the wavefront will be emitted from the waveguide at substantially the same angle that the wavefront is received at the input port. When the input port is at an end of the waveguide closest to the target, the wavefront may be received at the input port at an angle generally facing away from the target. The turn/redirection angle provided by the diffractive optical element may be sufficient to turn the non-zero diffractive order back towards the target despite the input port being closest to the target, and waveguiding generally occurring in the opposite direction. This is an arrangement that is not usually possible in the absence of large turn or direction angles. In some embodiments, the target may be an eye-box of the holographic projector. In other words, the input port of the waveguide may be positioned at or towards an end of the waveguide that is closest to the eye-box. In some embodiments, the target may be a portion of an optical combiner such as the windscreen of a vehicle. In some embodiments, the holographic projector is a holographic projector for a vehicle comprising an optical combiner (windscreen). The holographic projector may be part of a head-up display for the vehicle. The holographic projector may be positioned within a dashboard of the vehicle. The waveguide may comprise a first end and a second end. The first end may be referred to as the world or scene or reality end and may be the end of the waveguide that is furthest from the hologram recipient or viewer or driver or eye-box. The pair of surfaces of the waveguide may be substantially horizontal. In such cases, the second (driver or eye-box) end of the waveguide may be closest to the eye-box (or a portion of the optical combiner that receives the wavefront replicas emitted by the waveguide). The diffractive optical element may advantageously allow for a large enough turn/redirection of the wavefront replicas that the input port may be positioned at or towards the second (world) end of the waveguide. This would not possible in previous arrangements. For example, the prism array described above does not allow for a large enough turn of light to place the input port at or towards the second (world) end of the waveguide.

There are several advantages to providing the input port at or towards the second (driver) end of the waveguide, rather than at or towards the first (world/reality) end of the waveguide, particularly in the context of the holographic projector being part of a head-up display for a vehicle. Firstly, packaging of the holographic projector may be improved when the input port is at the second (driver) end of the waveguide. Real estate within the dashboard of a vehicle is expensive. Real estate furthest forward within the dashboard (close to the engine) is most expensive. By providing the input port at or towards the second end of the waveguide, a footprint of the input port, and any other associated optical elements required to create and project the wavefront into the input port, may be set rearwards of the optical combiner (windscreen) to occupy a less space restricted part of the dashboard. Secondly, better use may be made of the wavefronts emitted from the waveguide. The portion of the waveguide comprising the input port may not be suitable for providing waveguiding. Thus, wavefront replicas may not be emitted from a portion of the waveguide comprising the input port. Replicas emitted from the first (world) end may be incident on a lower portion of the windscreen (optical combiner) than replicas emitted from portions of first surface closer the second (driver) end. The inventors have found that it is preferable to sacrifice replicas incident higher on the windscreen than those lower on the windscreen. This ensures that the field of view of the projected hologram remains lower, closer to the road horizon.

The inventors have found that the above described positioning of the input port is a degree of design flexibility of the holographic projector that was not possible previously and which has been allowed because of the use of a diffractive optical element. As described above, the wavefront may need to be received at the input port within a particular range of angles in order for the wavefront to be waveguided. The emitted wavefront replicas may be substantially parallel to the received wavefront. So, in systems without a diffractive optical element, the input port may generally need to be positioned on an end of the waveguide that is furthest from a target that receives the waveguide replicas. While the array of prisms, described above, has previously been used to turn light, the amount of redirection possible with this arrangement is not enough to allow for the input port to be positioned at either end of the waveguide.

When the, the holographic projector comprises an array of louvres, each louvre of the array of louvres may be angled towards the input port. This may mean that the distal end/edge of each louvre (furthest from the first surface) is closer to the input port to the respective proximal end/edge of the louvre. The angled louvres may be angled with respect to a normal of a plane in which the first surface lies. This may be a third plane. The angle between each louvre and the normal of the third plane may be in the range of between 20 and 40 degrees, optionally between 25 and 30 degrees. The diffractive optical element may be arranged such that the common (principal) diffractive order of each replica is substantially parallel to louvres of the louvre array. In other words, the angle between each common (principal) diffractive order and the normal of the third plane may be between 20 and 40 degrees, optionally between 25 and 30 degrees.

The brightness of the wavefront, received at the input port and waveguided by the waveguide, may decrease with propagation distance from the input port. Without compensation, this may result in the brightness of wavefront replicas (and, in particular, the brightness of the common—principal—non-zero diffraction order) reducing with distance from the input port. This may be undesirable. In some embodiments, the diffractive optical element may be arranged such that the brightness of the common (principal) non-zero diffraction order is substantially constant for each replica. Thus, the diffractive optical element may be arranged to compensate for the decrease in brightness of the wavefront with distance from the input port owing to the increasing number of reflections or "bounces" within the waveguide.

In some embodiments, the diffractive optical element may be arranged such that the ratio of the brightness of the common (principal) non-zero diffraction order and a sum of the brightness of other diffraction orders varies with distance from the input port. The sum of the brightness of the other diffraction orders may comprise all non-zero diffraction orders except the common (principal) non-zero diffraction order. The sum of the brightness of other diffraction orders may alternatively or additionally comprise the zeroth order. The ratio may increase with distance from the input port. In other words, the proportion of light forming each wavefront replica that is redirected into the common (principal) non-zero diffraction order may increase with distance from the input port. Similarly, the proportion of light forming each wavefront replica that is redirected into other diffraction orders may decrease with distance from the input port. The increasing proportion of light being redirected into the common (principal) non-zero diffraction order advantageously compensates for the decreasing overall brightness of the wavefront with distance from the input port. The result may be that the brightness of the common (principal) non-zero diffraction order is substantially constant for each replica.

In other embodiments, the waveguide may be arranged such that the reflectivity of the first surface decreases with distance from the input port and the transmissivity increases with distance from the input port to compensate for the decreasing brightness of the wavefront. In this way, the intensity/brightness of the replicas of the wavefront emitted by the first surface may advantageously remain substantially constant along the length of the first surface. One way of achieving the increasing transmissivity is to apply a thin film or similar coating to the waveguide having variable, such as graded, reflectivity.

In a second aspect, there is provided a holographic projector comprising a waveguide comprising a pair of complementary/opposing/reflective surfaces arranged to receive and waveguide a hologram/holographic wavefront therebetween. A first surface of the pair of complementary surfaces is partially reflective-partially transmissive such that a plurality of replicas of the hologram/holographic wavefront are emitted therefrom. The holographic projector further comprises a diffractive optical element is arranged to receive the plurality of replicas of the hologram/holographic wavefront from the first surface of the waveguide and principally redirect each replica into a respective non-zero diffractive order defined by a (common) diffraction angle. An array of louvres is arranged to receive the (diffracted/redirected) hologram/holographic wavefronts from the diffractive optical element. The array of louvres is substantially transmissive at the non-zero diffraction angle and substantially non-transmissive at a zeroth diffraction angle of the diffractive optical element.

In a third aspect, there is provided a holographic projector comprising a waveguide comprising a pair of complementary/opposing/reflective surfaces arranged to receive and waveguide a hologram/holographic wavefront therebetween. A first surface of the pair of complementary surfaces is partially reflective-partially transmissive such that a plurality of replicas of the hologram/holographic wavefront are emitted therefrom. The holographic projector further comprises a diffractive optical element arranged to receive the plurality of replicas of the hologram/holographic wavefront from the first surface of the waveguide and principally redirect each replica into a respective non-zero diffractive order defined by a (common) diffraction angle. The waveguide further comprises an input port arranged to receive the wavefront. The input port of the waveguide is positioned at or toward an end of the waveguide that is closest to/proximal to a target for receiving the wavefront replicas emitted by the waveguide. In some embodiments, the target may be an eye-box of the holographic projector or a portion of an optical combiner such as the windscreen of a vehicle.

In a fourth aspect, there is provided a display system comprising the holographic projector of any one of the first to third aspect. The display system further comprising an optical combiner (windscreen). The holographic projector may be arranged such that the plurality of replicas of the hologram/holographic wavefront emitted by the waveguide are incident on the optical combiner to form a virtual image that is viewable from an eye-box. The waveguide may comprise a first end and a second end. The first end may be closest to the optical combiner. The second end may be closest to a driver of the vehicle. The waveguide may comprise an input port. The input port may be positioned at or towards the second end of the waveguide.

Features and advantages described in relation to one aspect may be applicable to one or more of the other aspects. In particular, features and advantages described in relation to the first aspect may be applicable to the holographic projector of the second and third aspect and the vehicle of the fourth aspect.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. It may therefore be said that a plurality of replicas of the hologram are formed. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer. The diffracted light field may form an image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

In the present disclosure, the term "substantially" when applied to a structural units of an apparatus may be interpreted as the technical feature of the structural units being produced within the technical tolerance of the method used to manufacture it.

Conventional Optical Configuration for Holographic Projection

Figure 1:
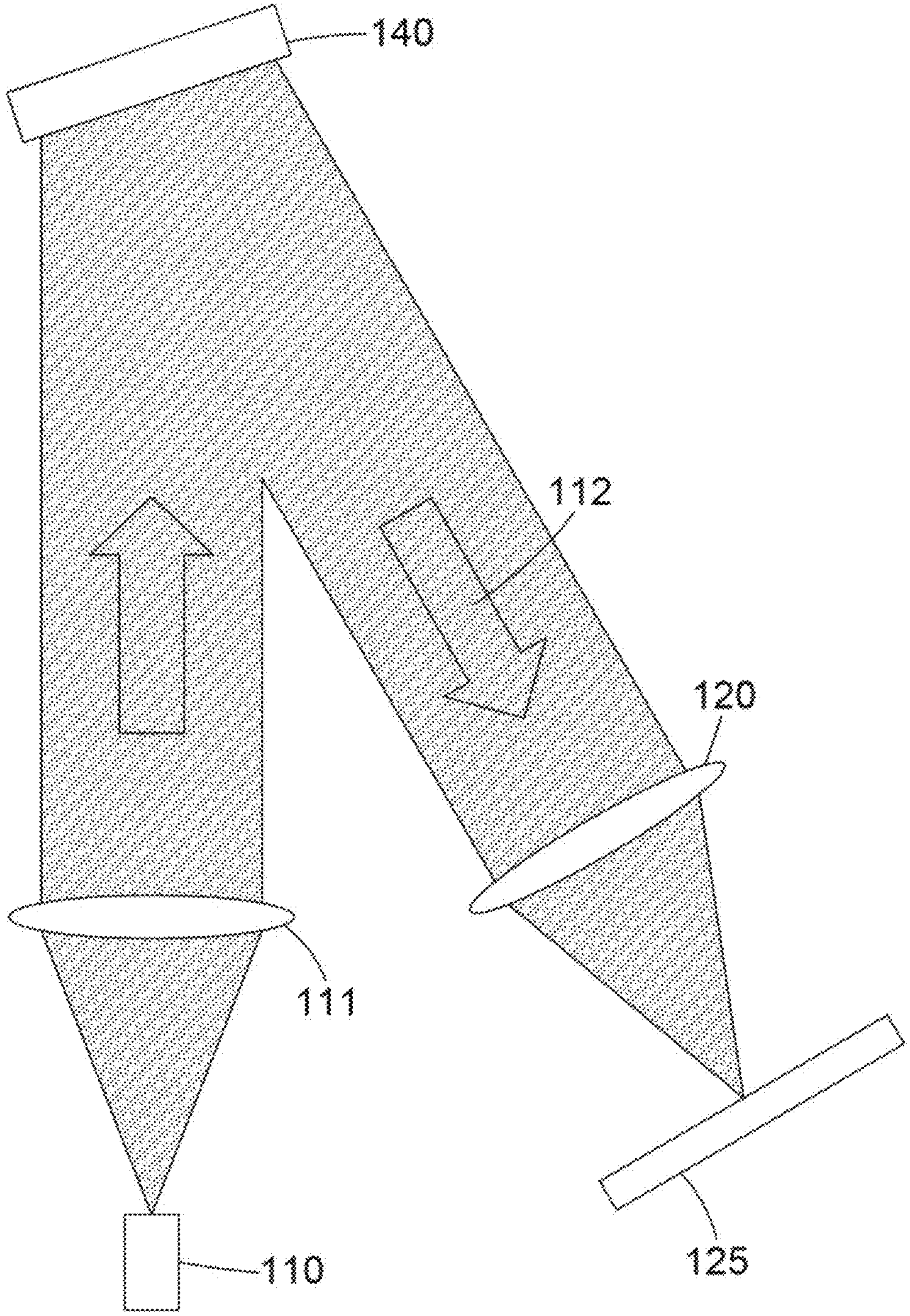
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform In some embodiments of the present disclosure, the lens of the viewer's eye performs the hologram to image transformation.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods.

In some embodiments, the hologram engine is arranged to exclude from the hologram calculation the contribution of light blocked by a limiting aperture of the display system. British patent application 2101666.2, filed 5 Feb. 2021

(published as GB2603517A) and incorporated herein by reference, discloses a first hologram calculation method in which eye-tracking and ray tracing are used to identify a sub-area of the display device for calculation of a point cloud hologram which eliminates ghost images. The sub-area of the display device corresponds with the aperture, of the present disclosure, and is used exclude light paths from the hologram calculation. British patent application 2112213.0, filed 26 Aug. 2021 (published as GB2610203A) and incorporated herein by reference, discloses a second method based on a modified Gerchberg-Saxton type algorithm which includes steps of light field cropping in accordance with pupils of the optical system during hologram calculation. The cropping of the light field corresponds with the determination of a limiting aperture of the present disclosure. British patent application 2118911.3, filed 23 Dec. 2021 (published as GB2614286A) and also incorporated herein by reference, discloses a third method of calculating a hologram which includes a step of determining a region of a so-called extended modulator formed by a hologram replicator. The region of the extended modulator is also an aperture in accordance with this disclosure.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Large Field of View Using Small Display Device

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other examples, the image is a real image formed by holographic reconstruction and the image is projected or relayed to the viewing plane. In these other examples, spatially modulated light of an intermediate holographic reconstruction formed either in free space or on a screen or other light receiving surface between the display device and the viewer, is propagated to the viewer. In both cases, an image is formed by illuminating a diffractive pattern (e.g., hologram or kinoform) displayed on the display device.

The display device comprises pixels. The pixels of the display may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some embodiments, the (light of a) hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre. And the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels).

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure encompasses non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window or eye-box. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram may also be a point cloud hologram. The hologram is described herein as routing light into a plurality of hologram channels to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically and uniquely, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels.

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffracted light field may be defined by a "light cone". Thus, the size of the diffracted light field (as defined on a two-dimensional plane) increases with propagation distance from the corresponding diffractive structure (i.e. display device). It can be said that the pupil expander/s replicate the hologram or form at least one replica of the hologram, to convey that the light delivered to the viewer is spatially modulated in accordance with a hologram.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

Light Channelling

The hologram formed in accordance with some embodiments, angularly-divides the image content to provide a plurality of hologram channels which may have a cross-sectional shape defined by an aperture of the optical system. The hologram is calculated to provide this channelling of the diffracted light field. In some embodiments, this is achieved during hologram calculation by considering an aperture (virtual or real) of the optical system, as described above.

Figure 2:
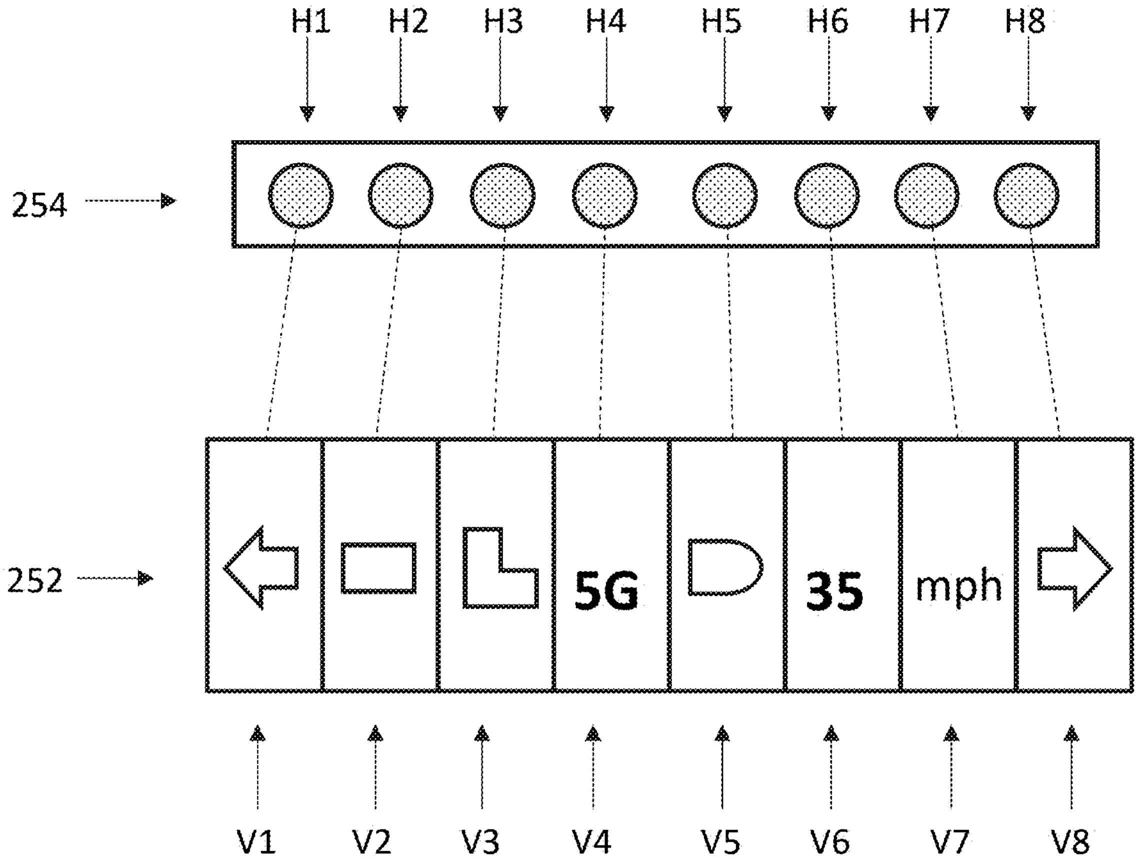
FIG. 2 shows an image for projection comprising eight image areas/components, V1 to V8, and cross-sections of the corresponding hologram channels, H1-H8.
Figure 3:
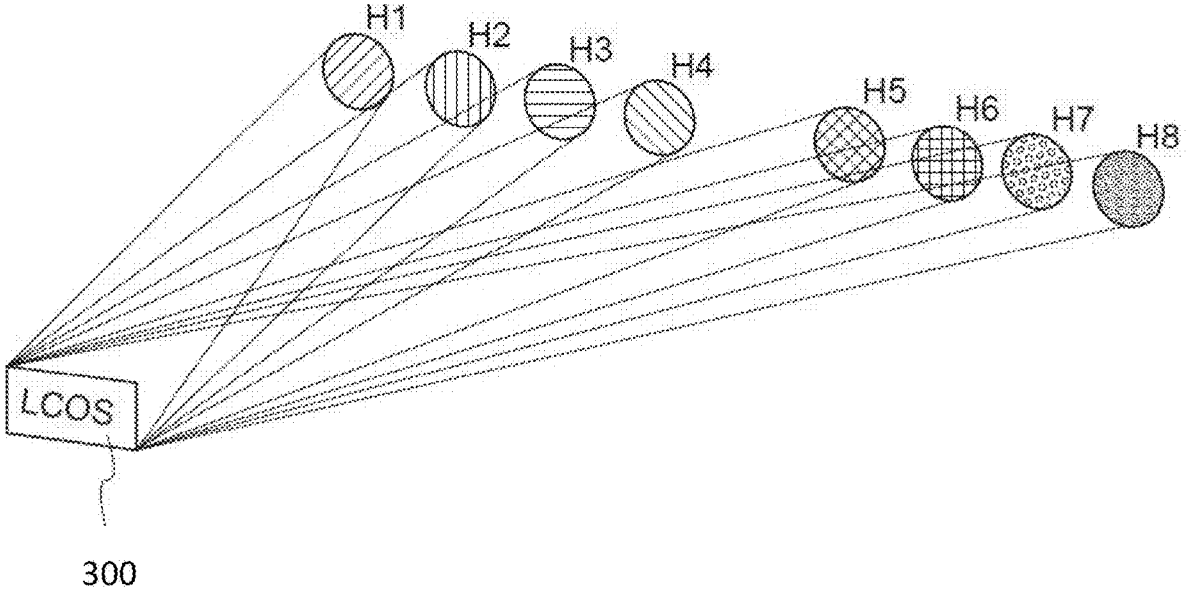
FIG. 3 shows a hologram displayed on an LCOS that directs light into a plurality of discrete areas.

FIGS. 2 and 3 show an example of this type of hologram that may be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram, displayed on LCOS 300 in this example, directs light into a plurality of discrete areas. The discrete areas are discs in the example shown but other shapes are envisaged. The size and shape of the optimum disc may, after propagation through the waveguide, be related to the size and shape of an aperture of the optical system such as the entrance pupil of the viewing system.

Figure 4:
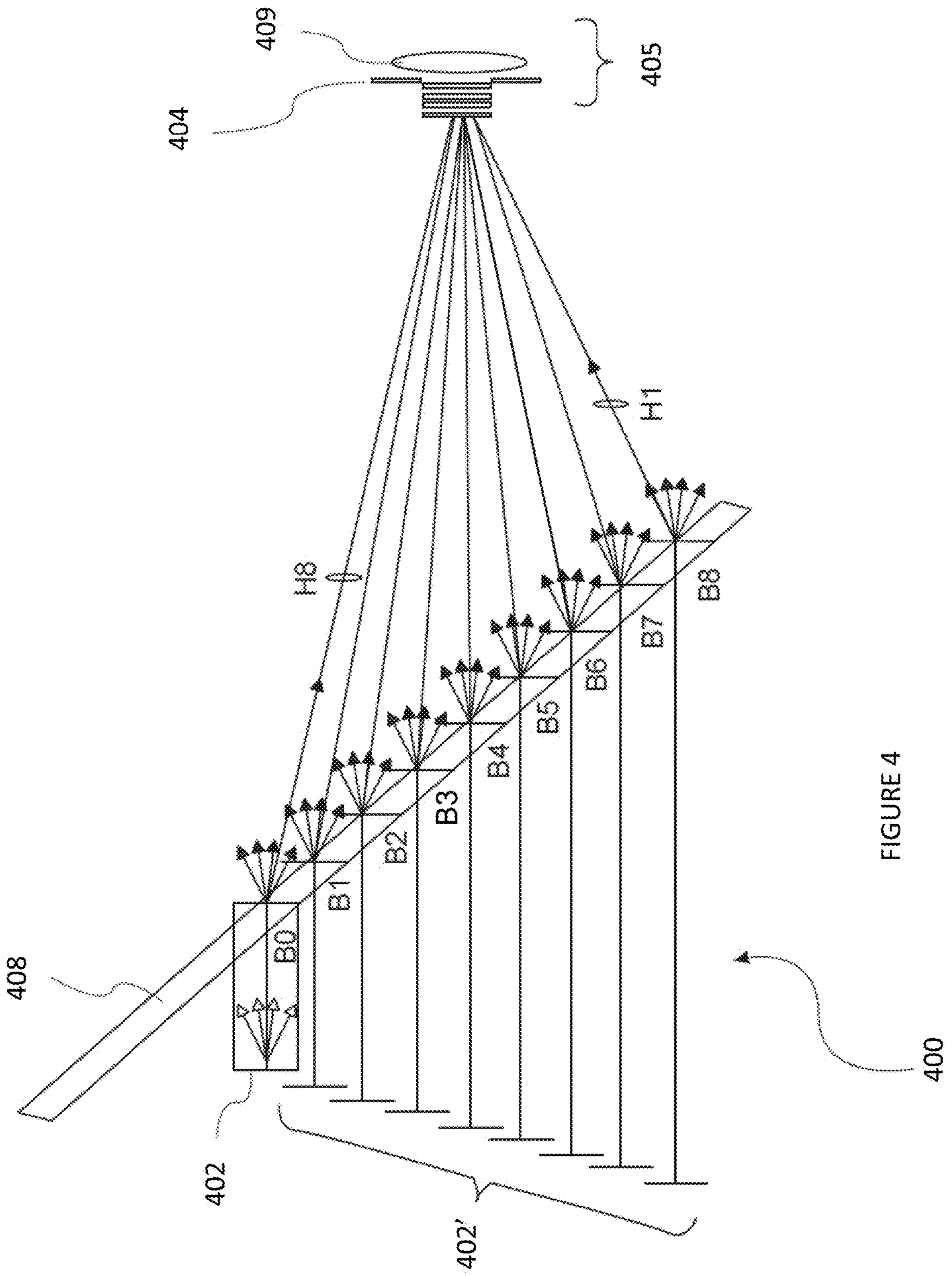
FIG. 4 shows a system, including a display device that displays a hologram that has been calculated as illustrated in FIGS. 2 and 3.

FIG. 4 shows a system 400, including a display device that displays a hologram that has been calculated as illustrated in FIGS. 2 and 3.

The system 400 comprises a display device, which in this arrangement comprises an LCOS 402. The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408. Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 5, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to a different portion of an image, the present disclosure and the systems that are described herebelow are not limited to such a hologram type.

Figure 5A:
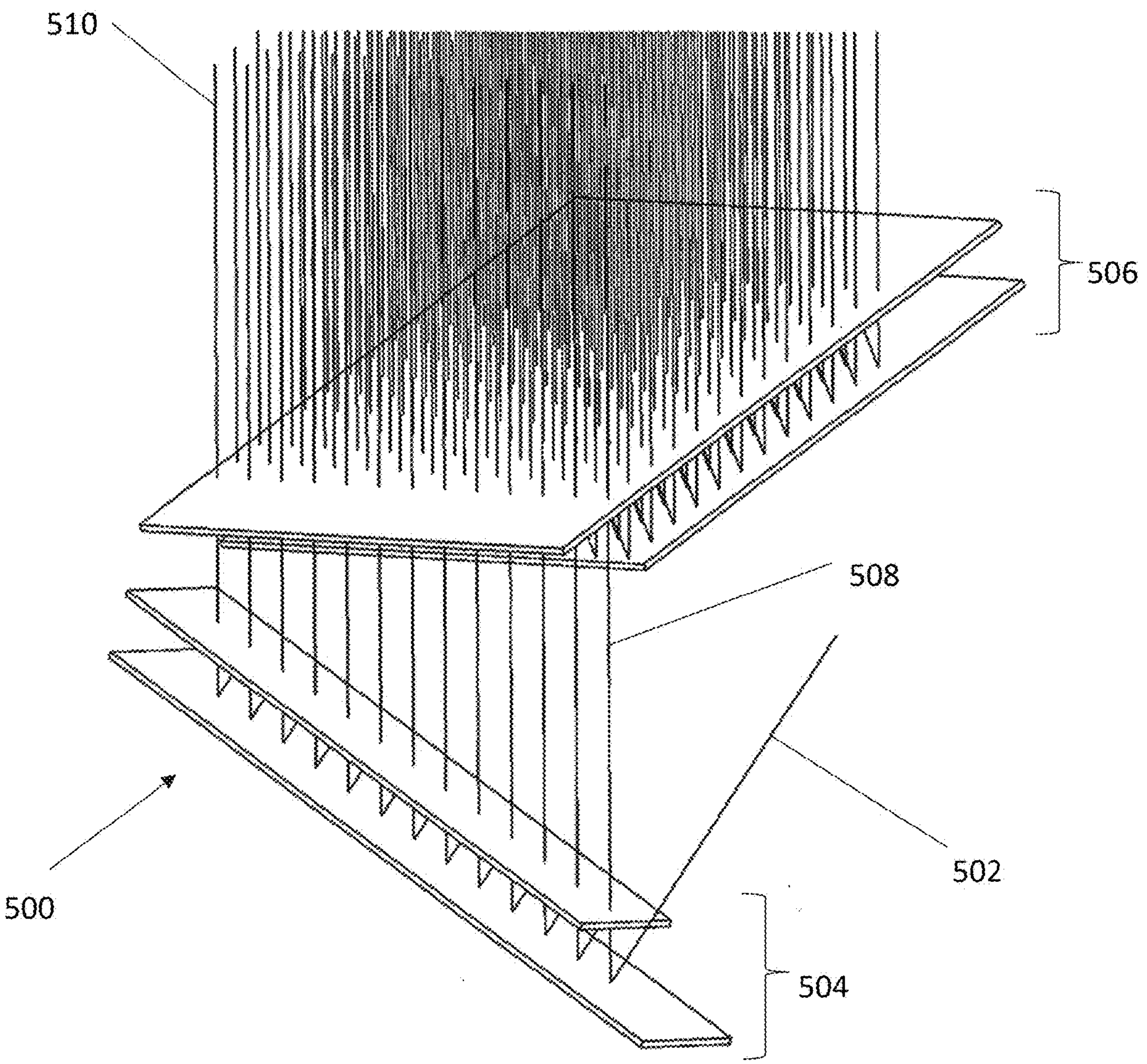
FIG. 5A shows a perspective view of a first example two-dimensional pupil expander comprising two replicators each comprising pairs of stacked surfaces.

FIG. 5A shows a perspective view of a system 500 comprising two replicators, 504, 506 arranged for expanding a light beam 502 in two dimensions.

In the system 500 of FIG. 5A, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The collimated light beam 502 is directed towards an input on the first replicator 504. Due to a process of internal reflection between the two surfaces, and partial transmission of light from each of a plurality of output points on one of the surfaces (the upper surface, as shown in FIG. 5A), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5A), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5A combine to provide a two-dimensional replicator (or, "two-dimensional pupil expander"). Thus, the replica light beams 510 may be emitted along an optical path to an expanded eye-box of a display system, such as a head-up display.

In the system of FIG. 5A, the first replicator 504 is a waveguide comprising a pair of elongate rectilinear reflective surfaces, stacked parallel to one another, and, similarly, the second replicator 504 is a waveguide comprising a pair of rectangular reflective surfaces, stacked parallel to one another. In other systems, the first replicator may be a solid elongate rectilinear waveguide and the second replicator may be a solid planar rectangular shaped waveguide, wherein each waveguide comprises an optically transparent solid material such as glass. In this case, the pair of parallel reflective surfaces are formed by a pair of opposed major sidewalls optionally comprising respective reflective and reflective-transmissive surface coatings, familiar to the skilled reader.

Figure 5B:
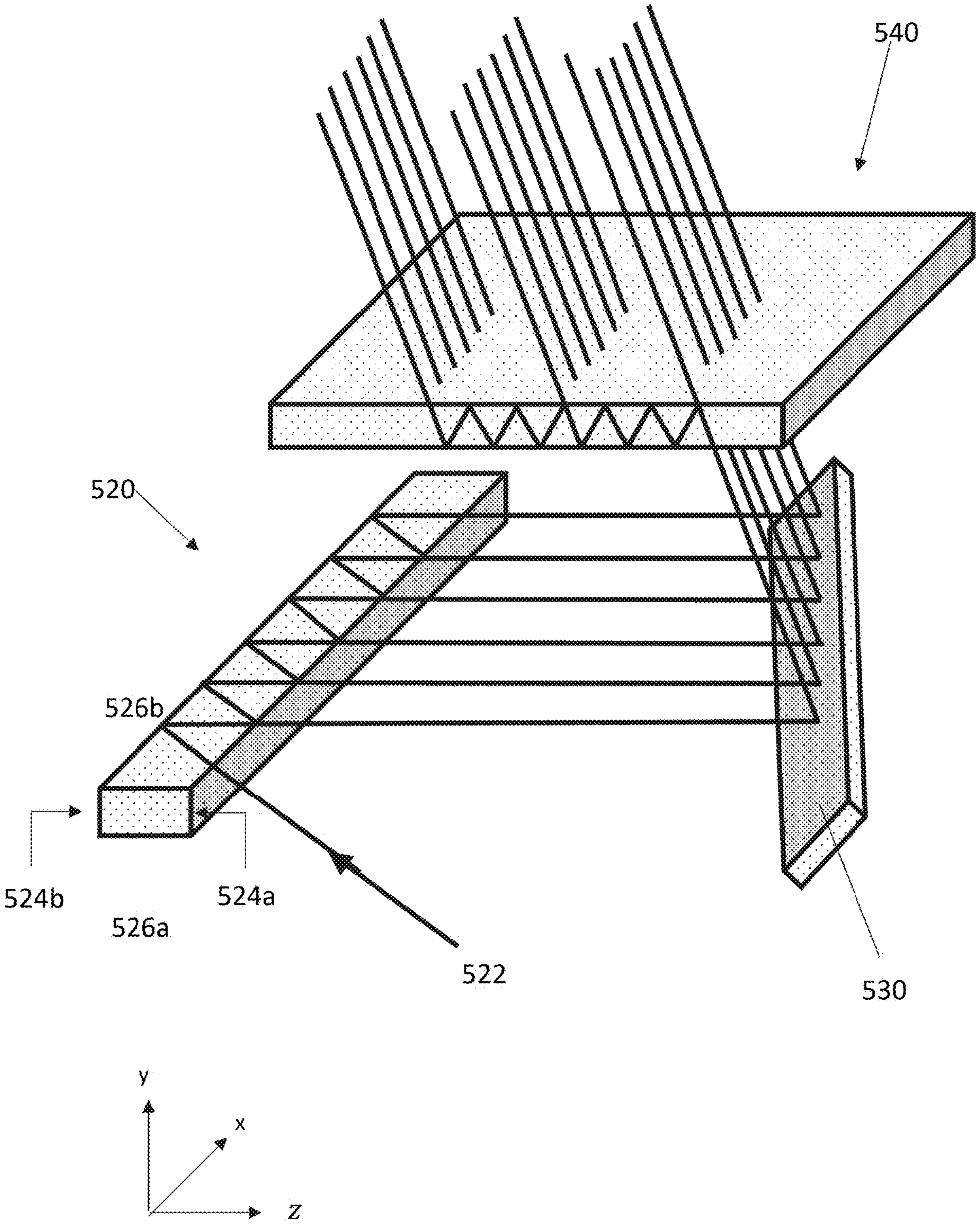
FIG. 5B shows a perspective view of a first example two-dimensional pupil expander comprising two replicators each in the form of a solid waveguide.

FIG. 5B shows a perspective view of a system 500 comprising two replicators, 520, 540 arranged for replicating a light beam 522 in two dimensions, in which the first replicator is a solid elongated waveguide 520 and the second replicator is a solid planar waveguide 540.

In the system of FIG. 5B, the first replicator/waveguide 520 is arranged so that its pair of elongate parallel reflective surfaces 524*a*, 524*b* are perpendicular to the plane of the second replicator/waveguide 540. Accordingly, the system comprises an optical coupler arranged to couple light from an output port of first replicator 520 into an input port of the second replicator 540. In the illustrated arrangement, the optical coupler is a planar/fold mirror 530 arranged to fold or turn the optical path of light to achieve the required optical coupling from the first replicator to the second replicator. As shown in FIG. 5B, the mirror 530 is arranged to receive light—comprising a one-dimensional array of replicas extending in the first dimension—from the output port/reflective-transmissive surface 524*a* of the first replicator/waveguide 520. The mirror 530 is tilted so as to redirect the received light onto an optical path to an input port in the (fully) reflective surface of second replicator 540 at an angle to provide waveguiding and replica formation, along its length in the second dimension. It will be appreciated that the mirror 530 is one example of an optical element that can redirect the light in the manner shown, and that one or more other elements may be used instead, to perform this task.

In the illustrated arrangement, the (partially) reflective-transmissive surface 524*a* of the first replicator 520 is adjacent the input port of the first replicator/waveguide 520 that receives input beam 522 at an angle to provide waveguiding and replica formation, along its length in the first dimension. Thus, the input port of first replicator/waveguide 520 is positioned at an input end thereof at the same surface as the reflective-transmissive surface 524*a*. The skilled reader will understand that the input port of the first replicator/waveguide 520 may be at any other suitable position.

Accordingly, the arrangement of FIG. 5B enables the first replicator 520 and the mirror 530 to be provided as part of a first relatively thin layer in a plane in the first and third dimensions (illustrated as an x-z plane). In particular, the size or "height" of a first planar layer—in which the first replicator 520 is located—in the second dimension (illustrated as the y dimension) is reduced. The mirror 530 is configured to direct the light away from a first layer/plane, in which the first replicator 520 is located (i.e. the "first planar layer"), and direct it towards a second layer/plane, located above and substantially parallel to the first layer/plane, in which the second replicator 540 is located (i.e. a "second planar layer"). Thus, the overall size or "height" of the system—comprising the first and second replicators 520, 540 and the mirror 530 located in the stacked first and second planar layers in the first and third dimensions (illustrated as an x-z plane)—in the second dimension (illustrated as the y dimension) is compact. The skilled reader will understand that many variations of the arrangement of FIG. 5B for implementing the present disclosure are possible and contemplated.

The image projector may be arranged to project a diverging or diffracted light field. In some embodiments, the light field is encoded with a hologram. In some embodiments, the diffracted light field comprises diverging ray bundles. In some embodiments, the image formed by the diffracted light field is a virtual image.

In some embodiments, the first pair of parallel/complementary surfaces are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of parallel surfaces is arranged to cause the light to propagate within the first waveguide pupil expander, with the general direction of light propagation being in the direction along which the first waveguide pupil expander is relatively long (i.e., in its "elongate" direction).

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field e.g. diffracted light comprising diverging (not collimated) ray bundles.

In some embodiments, the display system comprises a display device—such as a pixelated display device, for example a spatial light modulator (SLM) or Liquid Crystal on Silicon (LCoS) SLM—which is arranged to provide or form the diffracted or diverging light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extend by the use of at least one pupil expander.

The diffracted or diverging light field may be said to have "a light field size", defined in a direction substantially orthogonal to a propagation direction of the light field. Because the light is diffracted/diverging, the light field size increases with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

The first waveguide pupil expander may be substantially elongated and the second waveguide pupil expander may be substantially planar. The elongated shape of the first waveguide pupil expander may be defined by a length along a first dimension. The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn define an expanded eye-box area, from which the viewer can receive light of the input diffracted or diverging light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

The viewing plane, and/or the eye-box area, may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

Combiner Shape Compensation

An advantage of projecting a hologram to the eye-box is that optical compensation can be encoded in the hologram (see, for example, European patent 2936252 incorporated herein by herein). The present disclosure is compatible with holograms that compensate for the complex curvature of an optical combiner used as part of the projection system. In some embodiments, the optical combiner is the windscreen of a vehicle. Full details of this approach are provided in European patent 2936252 and are not repeated here because the detailed features of those systems and methods are not essential to the new teaching of this disclosure herein and are merely exemplary of configurations that benefit from the teachings of the present disclosure.

Control Device

The present disclosure is also compatible with optical configurations that include a control device (e.g. light shuttering device) to control the delivery of light from a light channelling hologram to the viewer. The holographic projector may further comprise a control device arranged to control the delivery of angular channels to the eye-box position. British patent application 2108456.1, filed 14 Jun. 2021 (published as GB2607899A) and incorporated herein by reference, discloses the at least one waveguide pupil expander and control device. The reader will understand from at least this prior disclosure that the optical configuration of the control device is fundamentally based upon the eye-box position of the user and is compatible with any hologram calculation method that achieves the light channeling described herein. It may be said that the control device is a light shuttering or aperturing device. The light shuttering device may comprise a 1D array of apertures or windows, wherein each aperture or window independently switchable between a light transmissive and a light non-transmissive state in order to control the delivery of hologram light channels, and their replicas, to the eye-box. Each aperture or window may comprise a plurality of liquid crystal cells or pixels.

Waveguide with Diffractive Optical Element

Figure 6A:
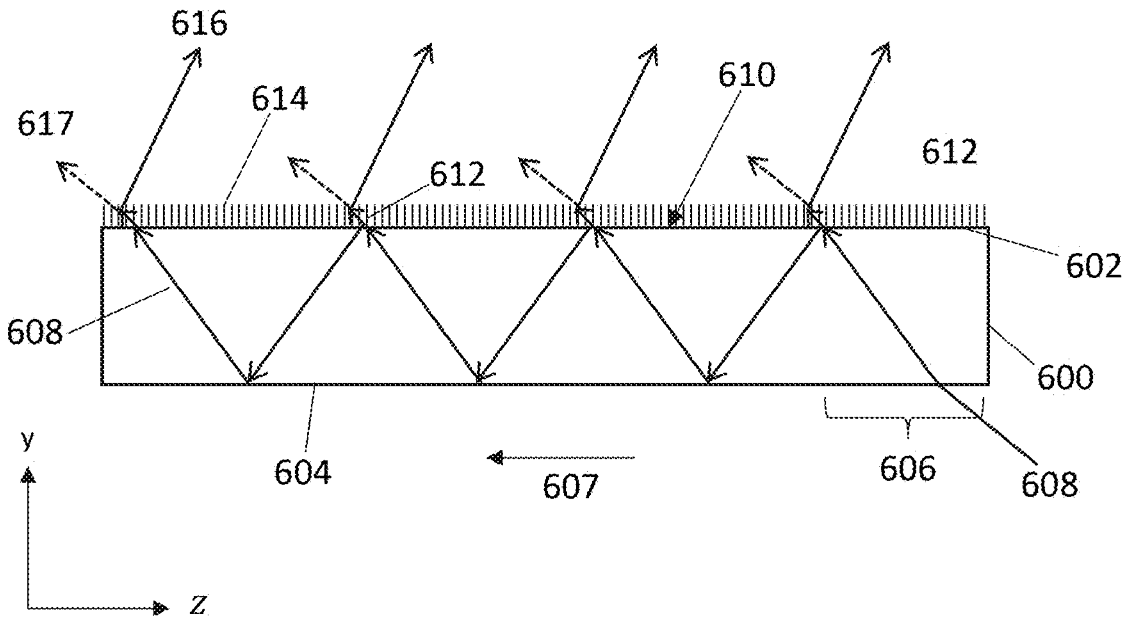
FIG. 6A is a first schematic cross-sectional view of a waveguide and optical diffractive element according to the disclosure.
Figure 6B:
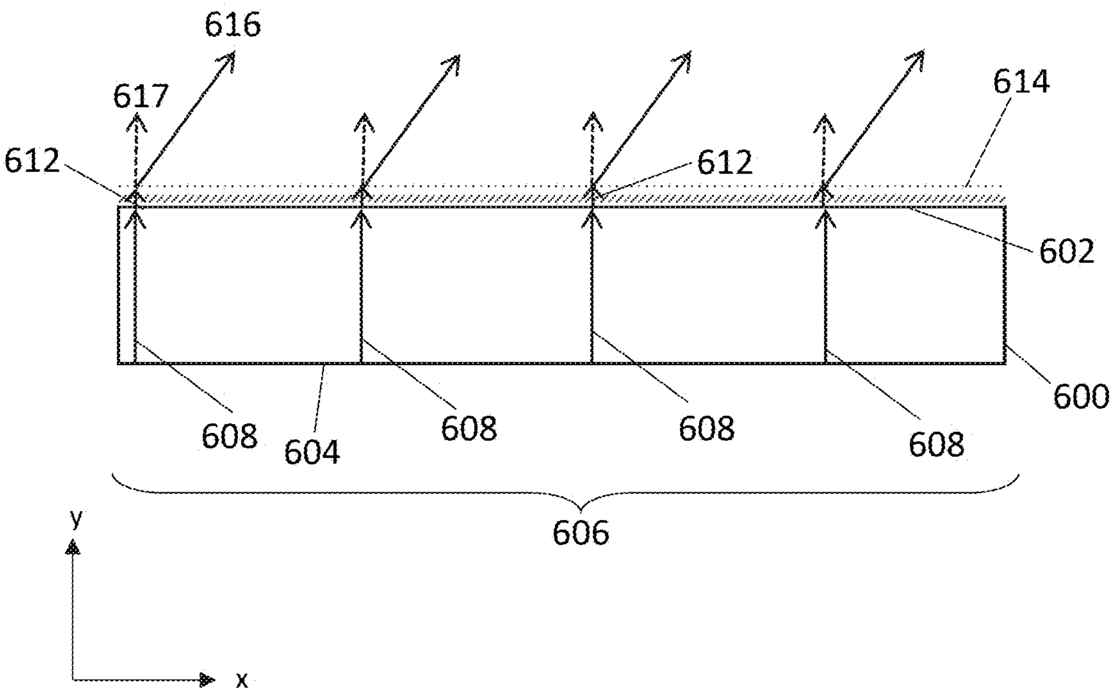
FIG. 6B is a second schematic cross-section view of the waveguide and optical diffractive element of FIG. 6A, the cross-section of FIG. 6A being perpendicular to the cross-section of FIG. 6B.

FIGS. 6A and 6B show schematic cross-sectional views of features of a holographic projector according to the disclosure. FIG. 6A shows a cross-section in the Y-Z plane corresponding to the Y and Z axes of FIG. 5. FIG. 6B shows a cross-section in the Y-X plane corresponding to the Y and X axes of FIG. 5. The Y-Z plane may be described as a first plane. The Y-X plane may be described as a second plane.

FIGS. 6A and 6B show a waveguide 600 which is similar to the second replicator/waveguide 540 of FIG. 5B. The waveguide 600 comprises a first reflective-transmissive surface 602 and a second reflective surface 604. The first and second surfaces 602, 604 are planar, are parallel to one another, and oppose one another. A portion of the second surface 604 forms an input port 606 for receiving one or more wavefront 608. A portion of the first surface 602 forms an output port 610 for outputting replicas 612 of the wavefront(s) 608. In use, one or more wavefronts 608 are received at the input port. The wavefronts 608 may be formed of spatially modulated light received from a spatial light modulator of the hologram projector (described above). The wavefront(s) 608 may be emitted by another waveguide (not shown in FIG. 6) prior to be received at the input port 606. As described in relation to FIG. 4, the one or more wavefronts 608 are reflected between the first and second surfaces and thus undergo one or more reflections (or “bounces”). At each bounce on the first reflective-transmissive surface 602 the wavefront 608 is divided such that a replica 612 of the wavefront is emitted from the first surface 602. The waveguide 600 is arranged such that the emitted wavefront replicas 612 are parallel. FIG. 6A shows how one wavefront 608 is input at the input port 606 and then waveguided in a general direction represented by arrow 607. The arrow 607 is parallel to the Y-Z plane and points in the negative z direction.

The hologram projector further comprises a diffractive optical element 614. The diffractive optical element 614 is arranged to receive the plurality of replicas 612 and to diffract each of the plurality of replicas 612. Each diffracted wavefront forms a plurality of diffraction orders. The diffractive optical element 614 is arranged such that the one or more wavefronts replicas 612 are principally redirected into the a first diffractive order 616. In some examples, this means that most (optionally more than 90% or even more than 95%) of the optical energy of each replica is redirected into the first diffractive order 616. So, the first diffractive order 616 is by far the brightest diffractive order. Other non-zero diffractive orders are not shown in FIG. 6 for ease of illustration and because these non-zero diffractive orders are so dim as to be almost negligible. The light redirected into the first diffractive order 616 is encoded with the same hologram/picture content as the respective input wavefront 608. Each first diffractive order is defined by a diffraction angle which is common to each replica because each replica has the same angle of incidence on the diffractive optical element 614. In other words, the first diffractive orders 616 of the replicas 612 are parallel. Because each replica is principally redirected into the first diffraction order, and other non-zero diffraction orders have negligible brightness/light energy, it may be said that the replicas 612 are effectively turned by the diffractive optical element 614. A first component of the “turn” is in the Y-Z plane and a second component of the “turn” is in the Y-X plane. Thus, the first diffractive order 616 is angled with respect to the normal of the waveguide in both FIGS. 6A and 6B.

Some of the light energy of each replica 612 is redirected into a zeroth order 617, which is shown in FIG. 6. The angle of each zeroth order 617 with respect to the normal of the waveguide is equal to the angle of incidence of the wavefront at the input port 606. The zeroth order 617 is transmitted by the diffractive optical element 614. The zeroth order 617 components of the replicas 612 are parallel.

The skilled person will be familiar with the fabrication of diffractive optical elements (DOEs). In particular, the skilled person will be familiar with fabricating diffractive optical elements comprising a volume hologram. In some embodiments, the diffractive optical element 614 can be fabricated by exposing a photo-thermo-refractive glass to an interference pattern from a laser such as an ultraviolet laser. The interference pattern corresponds to the calculated or computed hologram. The diffractive optical element may be a volume phase hologram (VPH).

The skilled person will be familiar with the general concept of computing or calculating a hologram for a DOE such that the DOE has desired diffractive properties. In the specific context of this disclosure, the hologram recorded in the DOE is computed so as to turn or redirect light into a non-zero diffractive zero having a desired angle (with respect to a normal of the diffractive optical element) and a desired intensity. The hologram may be calculated or computed such that light at a first wavelength is turned or redirected into a non-zero diffractive order having the desired angle and/or such that a desired proportion of energy of a wavefront is re-directed into the respect non-zero diffractive order. In some embodiments, the hologram may be calculated or computed such that light at a first wavelength and light at a second wavelength is turned or redirected into the same respective non-zero diffractive order having substantially the same angle. In some embodiments, the hologram may be calculated or computed to achieve the same with a third wavelength also. The first, second and third wavelengths may correspond to red, green and blue (laser) light respectively. In this way, the same waveguide/diffractive optical element can be used for a full colour image and the light of the different wavelengths (in the respective common non-zero diffractive order) will substantially not diverge at an eye-box of the holographic projector. When the diffractive optical element comprises a hologram/diffractive pattern computed or calculated to diffract light of multiple wavelengths into a common non-zero diffractive order at the desired angle, the proportion of light re-directed into that order may be lower than when the hologram is optimized for a single wavelength. This is because it can be difficult to calculate or compute a hologram that redirects light at multiple wavelengths in exactly the same way. In some examples, having a common angle for the respective common non-zero diffractive order at each wavelength is more important than the efficiency of the diffraction into that common order. In such examples, the skilled person will understand that the efficiency of the diffractive optical element may need to be compromised when the diffractive optical element is arranged for multiple wavelengths.

In order to fabricate the DOE, the computed hologram is recorded as a volume hologram, for example as a volume phase hologram (VPH). The skilled person will be familiar with such recording.

In one example, a VPH grating can be made by depositing a thin film of photo-sensitive material onto a glass substrate. The photo-sensitive material may be dichromated gelatin (DCG). The use of DCG in the formation of VPH gratings is well known (see, for example, BARSDEN S. Volume-Phase Holographic Gratings and the Efficiency of Three Simple Volume-Phase Holographic Gratings. Publications of the Astronomical Society of the Pacific, 112: 802 to 820, 2000 June—in particular page 812). In such examples, a VPH grating is made by depositing a thin film of sensitized DCG onto a glass substrate. A holographic exposure system is used to record an interferometrically produced wave pattern within the gelatin layer (the interferometrically produced wave pattern corresponding to the (computed) hologram described in the preceding paragraph). The grating is then processed resulting in a material density that translates to a specific value for the refractive index such that the original fringe pattern of the holographic exposure is imprinted into the grating as a modulation of its refractive index. Once desired grating parameters have been achieved, a glass cover is laminated onto the gelatin surface.

In another example, a VPH grating can be formed using one or more layers of a photo film such as Bayfol (Registered Trademark) HX120. Bayfol® HX120 is a light-sensitive photo film. Bayfol® HX120 film consists of a three layer stack of a substrate, a light-sensitive photopolymer and a protective cover film. A triacetate (TAC) substrate and a polyethylene terphthalate (PET) protective cover film are used. In order to record a hologram, the photopolymer film is laminated onto a glass plate. The holographic recording is done with two coherent and collimated laser beams which penetrate the prepared sample from two opposite sides. One of these beams is a signal beam and the other is a reference beam. The beams may interfere with one another to create an interference pattern corresponding to a hologram (similarly to the DCG approach disclosed above). The laser beams may cause photo-polymerization of the substrate. After the holographic recording, the material is bleached using a dose of ultraviolet light and, simultaneously, light having a wavelength in the visible range. After recording, the photopolymer film may be delaminated from the glass plate. In some embodiments, the VPH grating is formed in a single layer of the photo film. In such embodiments a single hologram may be computed and recorded in the single layer of photo film. In other embodiments, a plurality of layers photo films may be used to form the VPH grating. A (sub-) hologram may be recorded in each layer of photo film as described above. In particular, each layer of photo film may be laminated onto a glass substrate, a (sub-) hologram may be recorded using two laser beams, the photo film may then be bleached and de-laminated from the glass substrate. The process may be repeated for each layer of photo film. The plurality of layers of photo film (each comprising a recording of a sub-hologram) may then be stacked to together form the VPH. A different (sub-) hologram may be recorded in each layer of photo film. Each (sub-) hologram may be computed. As the skilled person will appreciate, the (sub-) holograms may be calculated such that a VPH having a desired performance is formed when the layers of photo-film are stacked up. In other words, each of the sub-holograms, when combined, may act as a volume hologram such as that recorded in DCG, as described above.

Figure 7A:
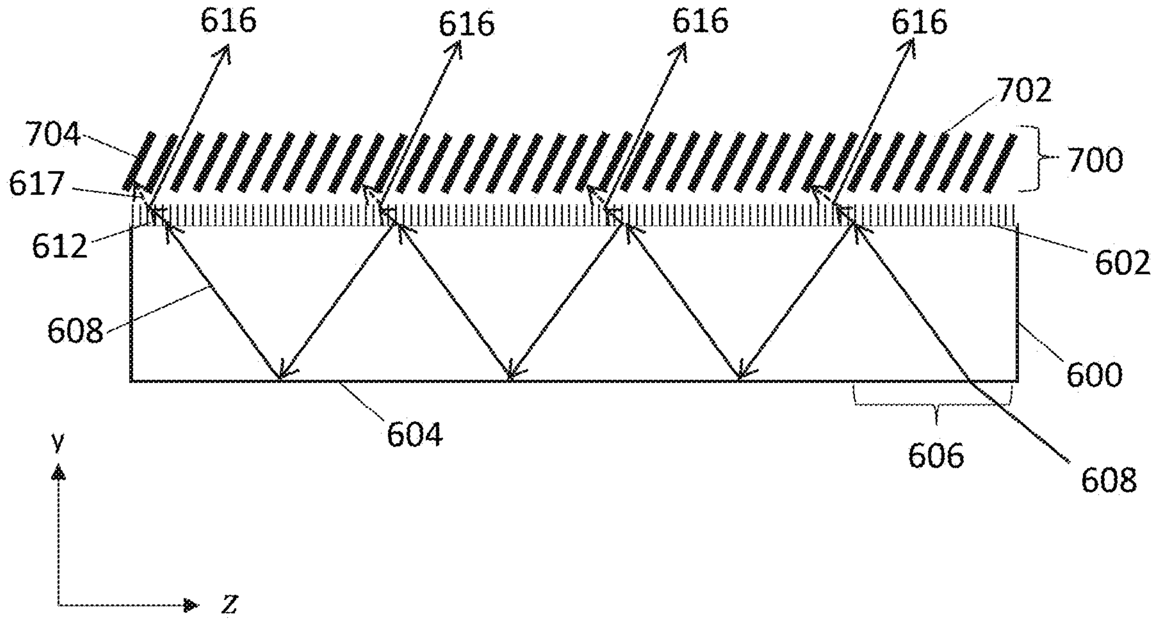
FIG. 7A is a first schematic cross-sectional view of a waveguide, optical diffractive element and array of louvres according to the disclosure.
Figure 7B:
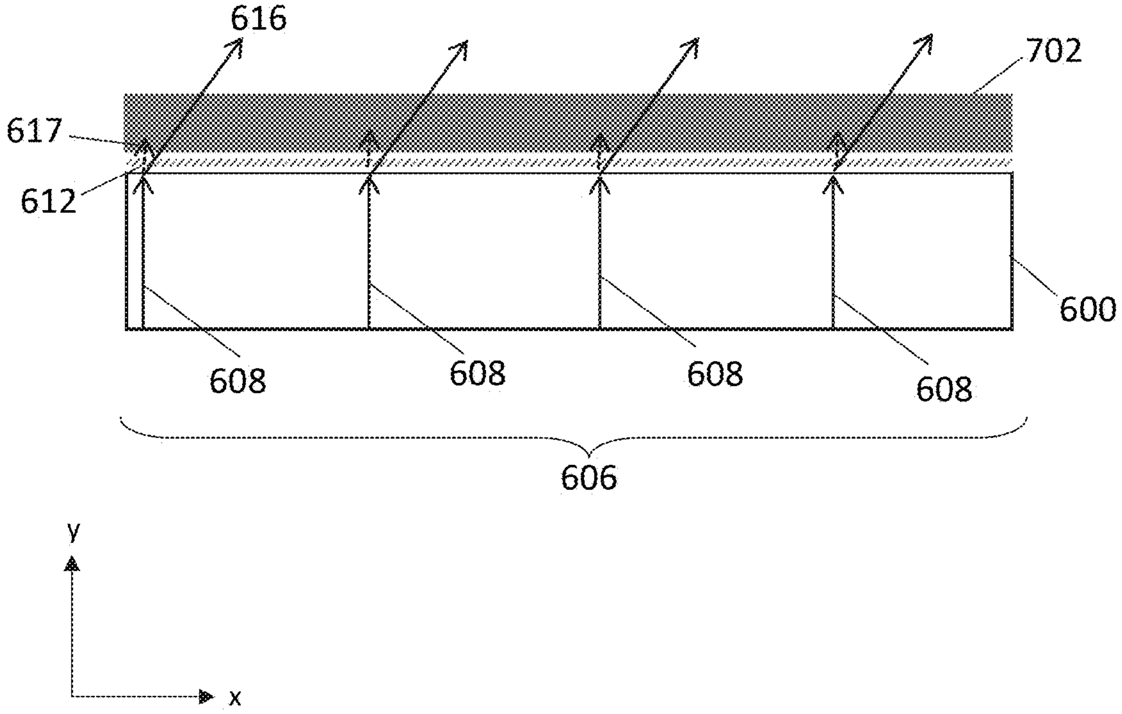
FIG. 7B is a second schematic cross-section view of the waveguide, optical diffractive element and array of louvres of FIG. 7A, the cross-section of FIG. 7A being perpendicular to the cross-section of FIG. 7B.

FIGS. 7A and 7B show features of a second embodiment of a holographic projector. The holographic projector of the second embodiment is similar to the holographic projector of the first embodiment and like features are numbered accordingly. The main difference between the holographic projectors of the first and second embodiments is that the holographic projector of the second embodiment additionally comprises a reflection suppression layer 700 comprising an array of louvres 702. Each louvre 702 of the array of louvres is parallel. Each of the louvres 702 comprises a sidewall 704 extending in the Y-Z plane. Each louvre 702 is elongated in the x-axis to form a slat. The sidewall 704 of each louvre is angled with respect to a normal of a plane of the first surface 602 of the waveguide 600. In particular, the sidewall 704 of each louvre is angled to be parallel to the common diffraction angle of the first diffractive order 616.

In this way, wavefront replica light that has been redirected into the first diffractive order 616 is transmitted through the louvre array. Thus, the array of louvres may be described as substantially transmissive at the first diffractive order angle. The zeroth order, however, is not parallel to the array of louvres. So, as shown in FIG. 7A, each zeroth diffractive order 617 is incident on a louvre 702. The louvres 702 are arranged to absorb the zeroth diffractive order 617 light and so substantially prevent the zeroth diffractive order 617 (noise) from reaching an eye-box. Thus, the louvre array may be described as being substantially non-transmissive at a zeroth diffraction angle of the diffractive optical element. The array of louvres 702 also suppress reflections/glare. The louvres 702 are arranged to absorb sunlight incident on louvres 702 thus preventing the sunlight from being redirected/reflected by the waveguide towards the eye-box.

Figure 8:
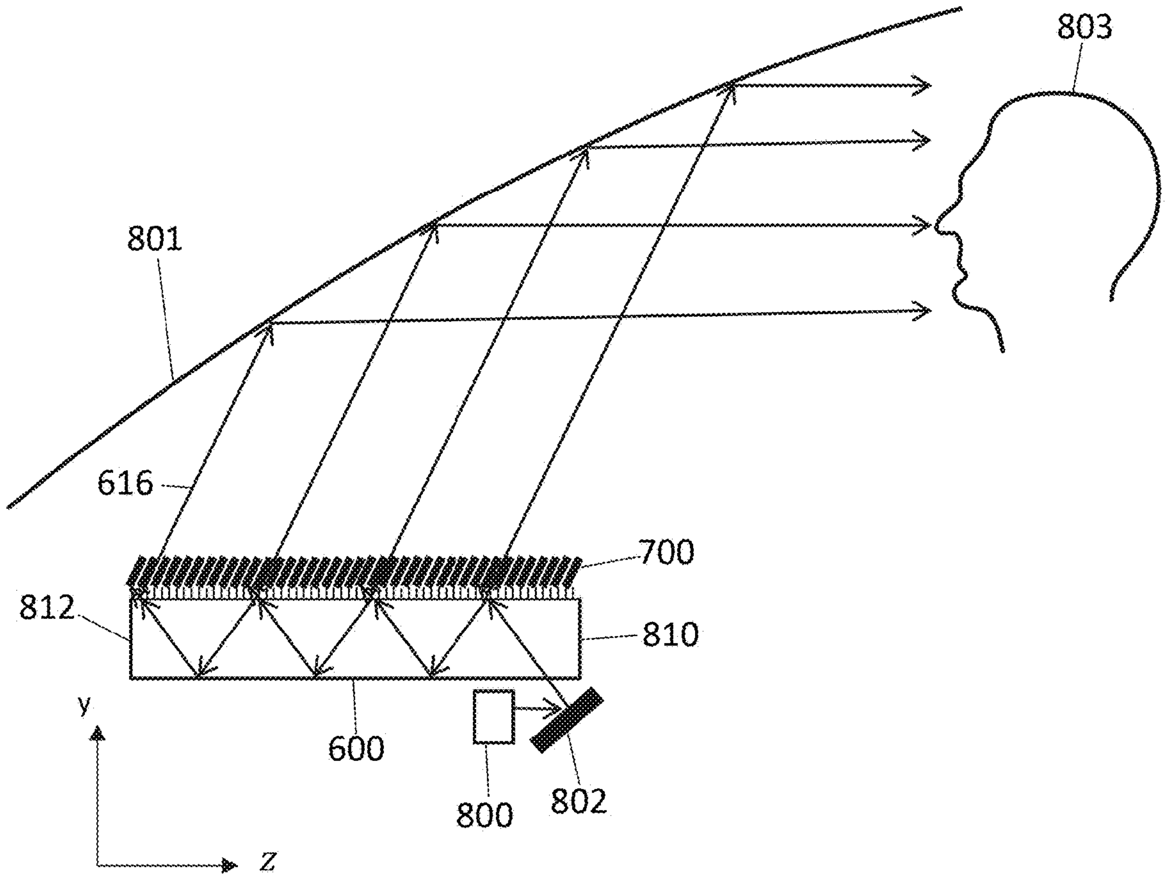
FIG. 8 is a schematic view of the holographic projector of FIG. 7A in combination with an optical combiner (windscreen) and user (driver.

FIG. 8 shows the holographic projector of FIG. 7 in positioned within the dashboard (not shown) of a vehicle comprising a windscreen 801 (optical combiner) and a driver 803. In addition to the reflection suppression layer 700, the waveguide 600 and the diffractive optical element 614, FIG. 8 shows another waveguide 800 and a turn mirror 802. The waveguide 800 is in the shape of a rod and acts to perform pupil expansion in a first dimension. The waveguide 800 may be referred to as the first waveguide 800. The waveguide 600 is in the form of a slab and performs pupil expansion in a second dimension. The waveguide 600 may be referred to as the second waveguide. A wavefront is expanded in the first dimension by the first waveguide 800, and then reflected towards the input port 606 of the second waveguide 600. As described above, the wavefront is then expanded in the second dimension by the second waveguide 600. Replicas of the wavefront are emitted by the first surface of the waveguide 600 towards the windscreen 801. At least a portion of the light energy of each replica is reflected by the windscreen 801 towards an eye-box. The driver 803 may be able to view a virtual image from the eye-box.

The second waveguide comprises a first (world/reality) end 812 and a second (driver) end 810. As shown in FIG. 8, the input port 606 is closest to the driver end 810 of the second waveguide. The second end 810 is closest to the eye-box (at the position of the driver 803). This is advantageous from a packaging perspective at least because it means that the first waveguide 800 and the turn mirror 802 can be positioned in an area of the dashboard where real estate is less expensive.

Figure 9:
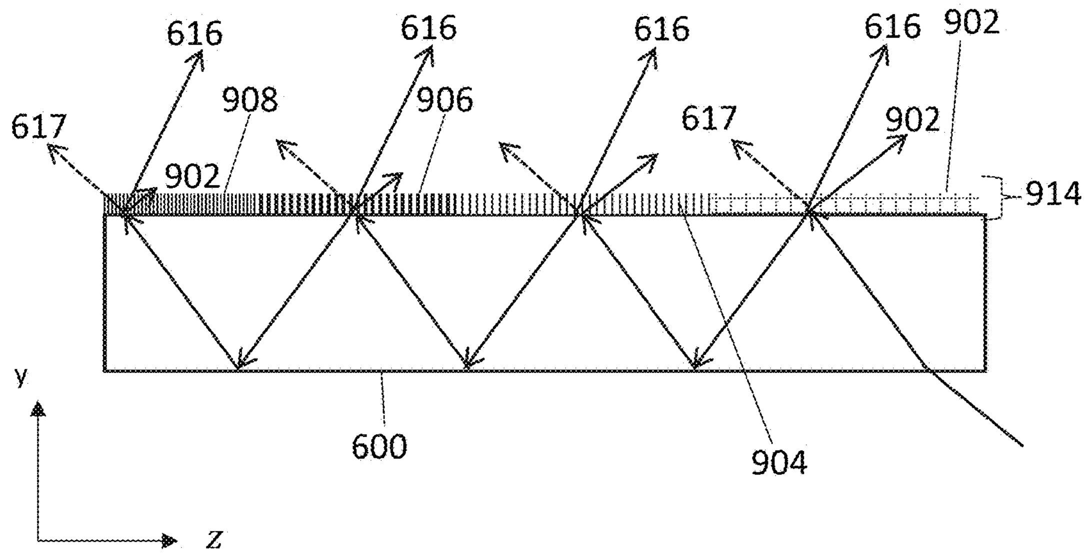
FIG. 9 is a cross-sectional schematic view of a waveguide and optical diffractive element according to another embodiment of the disclosure.

FIG. 9 shows a schematic view of features of a holographic projector according to a third embodiment of the disclosure. This embodiment is similar to the first embodiment and like features are numbered accordingly. Unlike in the previous examples, FIG. 9 shows the second diffractive order 902, in addition to the first diffractive order 616, for each replica.

The third embodiment differs in that the diffractive optical element 914 is arranged to vary the proportion of light energy redirected into each of the diffractive orders along the length of the waveguide 600. In this example, the diffractive optical element 914 comprises four zones 902, 904, 906 and 908. Each of the zones is arranged such that the diffractive angle of the first diffractive order 616 is the same along the length of the waveguide 600 but such that the proportion of light redirected into the first diffractive order 616 increases along the length of the waveguide 600 (with increasing distance from the input port 606). In other words, a ratio of the brightness of the first diffractive order 616 to the sum of the brightness of all the other non-diffractive orders increases with distance from the input port 606. This is demonstrated schematically in FIG. 9 by the decreasing lengths of the lines representing the second diffractive order 902. The second diffractive order 902 is shown by way of example only to represent the amount of energy in the non-primary diffraction orders of the replica. The purpose of this arrangement is to compensate for a decrease in the overall brightness of the wavefront being waveguided between the first and second surfaces 602, 604 with distance from the input port 606. The wavefront 608 will decrease in brightness at each bounce on the first surface 602 as light energy is lost to replicas. The wavefront will also decrease in brightness as a function of distance from the input port 606 because the waveguide 600 will absorb some light energy. By increasing the proportion of light that is redirected into the first diffractive order 616 for each replica, the decrease in overall wavefront brightness can be at least partially compensated for. In particular, as represented by the length of the arrows showing the first diffractive order 616, the brightness of each first diffractive order 616 may be constant.

In the above examples, the wavefront has been described as being principally redirected into the first diffractive order. However, it should be understood that the diffractive optical element 614 could be configured to principally redirect light into any non-zero diffractive order. Furthermore, FIGS. 6 to 9 each show just four "bounces" and the subsequent creation of four replicas. However, it should be understood that the waveguide may be arranged so that any number of replicas is created, in particular more than four replicas.

Additional Features

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector comprising:

a spatial light modulator arranged to spatially modulate incident light;

a waveguide comprising a pair of complementary surfaces arranged to receive a wavefront comprising modulated light from the spatial light modulator, waveguide the wavefront therebetween, and emit a plurality of replicas of the wavefront from a first surface of the pair of complementary surfaces that is partially reflective-partially transmissive;

a diffractive optical element arranged to receive the plurality of replicas of the wavefront from the first surface of the waveguide and principally redirect each replica into a respective non-zero diffractive order defined by a non-zero diffraction angle; and an array of louvres arranged to receive the plurality of replicas of the wavefront from the diffractive optical element, wherein the array of louvres is transmissive at the non-zero diffraction angle and non-transmissive at a zeroth diffraction angle of the diffractive optical element.

2. The holographic projector as claimed in claim 1, wherein the array of louvres are arranged to absorb the zeroth diffractive order.

3. The holographic projector as claimed in claim 1, wherein, in a first plane, an angle between the zeroth diffraction order and the non-zero diffractive order is in the range 40 to 70 degrees at a first wavefront wavelength.

4. The holographic projector as claimed in claim 3, wherein, in the first plane, the angle between the zeroth diffraction order and the non-zero diffractive order is in the range 40 to 70 degrees at a second and third wavefront wavelength.

5. The holographic projector as claimed in claim 1, wherein, in a second plane, an angle between the zeroth diffraction order and the non-zero diffractive order is in the range 10 to 20 degrees.

6. The holographic projector as claimed in claim 1, wherein the non-zero diffractive order into which the replicas of the wavefront are principally redirected is the first diffractive order.

7. The holographic projector as claimed in claim 1, wherein the waveguide comprises an input port arranged to receive the wavefront.

8. The holographic projector as claimed in claim 7, wherein the input port is positioned at or towards an end of the waveguide that is closest to an eye-box of the holographic projector.

9. The holographic projector as claimed in claim 7, wherein each louvre of the array of louvres is angled towards the input port.

10. The holographic projector as claimed in claim 9, wherein a distal end/edge of each louvre is closer to the input port than the respective proximal end/edge of the louvre and wherein the distal end/edge is furthest from the first surface.

11. The holographic projector as claimed in claim 7, wherein the louvres are angled with respect to a normal of a plane of the first surface.

12. The holographic projector as claimed in claim 1, wherein the holographic projector the array of louvres is part of a reflection suppression layer of the holographic projector.

13. The holographic projector as claimed in claim 1, wherein the diffractive optical element is a holographic optical element.

14. The holographic projector as claimed in claim 1, wherein the diffractive optical element comprises a volume hologram.

15. The holographic projector as claimed in claim 14, wherein the volume hologram is a volume Bragg grating.

16. The holographic projector as claimed in claim 1, wherein the diffractive optical element is arranged such that a ratio of the brightness of the non-zero diffraction order and a sum of the brightness of other diffraction orders for each of the replica wavefronts varies with distance from the input port.

17. A display system comprising the holographic projector of claim 1 and further comprising an optical combiner, wherein the holographic projector is arranged such that the plurality of replicas of the holographic wavefront emitted by the waveguide are redirected from the optical combiner to form a virtual image that is viewable from an eye-box.

18. The display system according to claim 17, wherein the waveguide comprises a first end and a second end, the first end being closest to the optical combiner, and wherein the waveguide further comprises an input port arranged to receive the wavefront, the input port positioned at or towards the second end of the waveguide.

19. The holographic projector as claimed in claim 1, wherein the wavefront is encoded with a hologram.

20. The holographic projector as claimed in claim 1, wherein the diffractive optical element is arranged to, while principally redirecting each replica into the respective non-zero diffractive order to provide the plurality of replicas of the wavefront, the plurality of replicas of the wavefront being a plurality of diffracted replicas, transmitting a plurality of zeroth-order replicas of the wavefront at a zeroth diffraction angle of the diffractive optical element; and the array of louvres is arranged to transmit the plurality of diffracted replicas of the wavefront and to block the zeroth-order replicas of the wavefront.

21. A method for holographic projection, the method comprising spatially modulating light from a spatial light modulator;

receiving a wavefront comprising a wavefront comprising modulated light from the spatial light modulator by a waveguide comprising a pair of complementary surfaces;

waveguiding the wavefront in the waveguide between the pair of complementary surfaces;

emitting a plurality of replicas of the wavefront from a first surface of the pair of complementary surfaces that is partially reflective-partially transmissive;

receiving the plurality of replicas of the wavefront from the first surface of the waveguide by a diffractive optical element;

principally redirecting with the diffractive optical element each replica into a respective non-zero diffractive order defined by a non-zero diffraction angle to provide a plurality of diffracted replicas of the wavefront, while transmitting with the diffractive optical element a plurality of zeroth order replicas at a zeroth diffraction angle of the diffractive optical element;

receiving the plurality of diffracted replicas and the plurality of zeroth-order replicas of the wavefront at an array of louvres; and transmitting through the array of louvres the plurality of diffracted replicas, while blocking by the array of louvres the plurality of zeroth order replicas.

* * * * *